United States Patent
Fedyak

(10) Patent No.: US 11,323,543 B2
(45) Date of Patent: May 3, 2022

(54) SYSTEM AND METHOD FOR CONTENT PARSING

(71) Applicant: Utech, Inc., Oakbrook Terrace, IL (US)

(72) Inventor: Igor Fedyak, Hoffman Estates, IL (US)

(73) Assignee: UTECH, INC., Oakbrook Terrace, IL (US)

(*) Notice: Subject to any disclaimer, the term of this patent is extended or adjusted under 35 U.S.C. 154(b) by 0 days.

(21) Appl. No.: 17/161,495

(22) Filed: Jan. 28, 2021

(65) Prior Publication Data

US 2021/0152663 A1 May 20, 2021

Related U.S. Application Data

(63) Continuation of application No. 16/173,930, filed on Oct. 29, 2018, now Pat. No. 10,911,570.

(60) Provisional application No. 62/580,899, filed on Nov. 2, 2017.

(51) Int. Cl.
| | |
|---|---|
| *G06F 15/16* | (2006.01) |
| *H04L 67/63* | (2022.01) |
| *H04L 67/1014* | (2022.01) |
| *G06F 9/50* | (2006.01) |
| *H04L 67/125* | (2022.01) |
| *H04L 69/22* | (2022.01) |
| *H04L 67/01* | (2022.01) |

(52) U.S. Cl.
CPC ............ *H04L 67/327* (2013.01); *G06F 9/505* (2013.01); *G06F 9/5033* (2013.01); *G06F 9/5055* (2013.01); *H04L 67/1014* (2013.01); *H04L 67/125* (2013.01); *H04L 67/42* (2013.01); *H04L 69/22* (2013.01)

(58) Field of Classification Search
CPC .. H04L 67/327; H04L 67/1014; H04L 67/125; H04L 67/42; H04L 69/22; G06F 9/5033; G06F 9/505; G06F 9/5055
USPC .......................................... 709/205
See application file for complete search history.

(56) References Cited

U.S. PATENT DOCUMENTS

| | | | | |
|---|---|---|---|---|
| 7,406,402 | B1* | 7/2008 | Waitkus, Jr. | G06Q 10/08 702/188 |
| 8,166,000 | B2* | 4/2012 | Labrie | G06F 16/215 707/694 |
| 8,346,909 | B2* | 1/2013 | Dan | H04L 67/1025 709/224 |
| 9,239,740 | B2* | 1/2016 | Zhao | G06F 9/5044 |
| 9,755,969 | B2* | 9/2017 | Agarwal | H04L 45/26 |
| 10,007,717 | B2* | 6/2018 | Zhang | G06F 16/35 |
| 10,911,570 | B2* | 2/2021 | Fedyak | H04L 69/22 |

(Continued)

*Primary Examiner* — Alicia Baturay
(74) *Attorney, Agent, or Firm* — Tucker Ellis LLP

(57) ABSTRACT

In accordance with an embodiment, described herein is a system and method for receiving content to be parsed, and configuring a network of parsing devices for use in parsing the content in accordance with templates. The system comprises a management server in communication with the parsing network, and the management server is configured to determine a parsing assignment for one or more parsing devices within the parsing network. The parsing network comprises a plurality of parsing devices, each comprising or associated with an endpoint for enabling communication with the management server. The parsing assignment indicates content items to be parsed by the parsing devices and associated templates for use by the parsing devices.

19 Claims, 11 Drawing Sheets

(56) References Cited

U.S. PATENT DOCUMENTS

2002/0059264 A1* 5/2002 Fleming ................ G06Q 40/02
2010/0299714 A1* 11/2010 Ramasubramanian ......................
                                                     H04N 21/6143
                                                         725/109

* cited by examiner

SYSTEM AND METHOD FOR CONTENT PARSING

CLAIM OF PRIORITY

This application is a continuation of U.S. patent application Ser. No. 16/173,930, titled "System and Method for Content Parsing," filed Oct. 29, 2018; which claims the benefit of priority to U.S. Provisional Patent Application No. 62/580,899, titled "System and Method for Content Parsing," filed Nov. 2, 2017; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to content parsing, and are particularly related to a system and method for configuring a network of parsing devices for content parsing in accordance with templates.

BACKGROUND

Information-driven enterprises are increasingly searching for ways to increase their speed and efficiency in collecting and processing data relevant to their businesses. Systems tasked with extraction of such data can experience issues when the data is contained within large volumes of content, the processing of which can involve cumbersome procedures and long processing times. Additionally, a user may need to interface with numerous content items from multiple different sources to identify relevant data, which can be difficult to manage. Also, relevant data can be difficult to locate due to the many different formatting styles in which content can be presented. Some parsing systems may not be capable of handling the large volume of content required by an enterprise, or may not be able to provide extracted data in a timely manner.

SUMMARY

In accordance with an embodiment, described herein is a system and method for receiving content to be parsed, and configuring a network of parsing devices (parsing network) for use in parsing the content in accordance with templates. The system comprises a management server in communication with the parsing network, and the management server is configured to determine a parsing assignment for one or more parsing devices within the parsing network. The parsing network comprises a plurality of parsing devices, each comprising or associated with an endpoint for enabling communication with the management server. The parsing assignment indicates content items to be parsed by the parsing devices and associated templates for use by the parsing devices.

DETAILED DESCRIPTION

The foregoing, together with additional embodiments and features thereof will become apparent upon referring to the following description including specification, claims, and accompanying drawings and appendices. In the following description, for purposes of explanation, specific details are set forth in order to provide a thorough understanding of various embodiments of the invention. However, it will be apparent that various embodiments can be practiced without these specific details. The following description including specification, claims, and accompanying drawings and appendices are intended to be illustrative and not restrictive.

Figure 1:
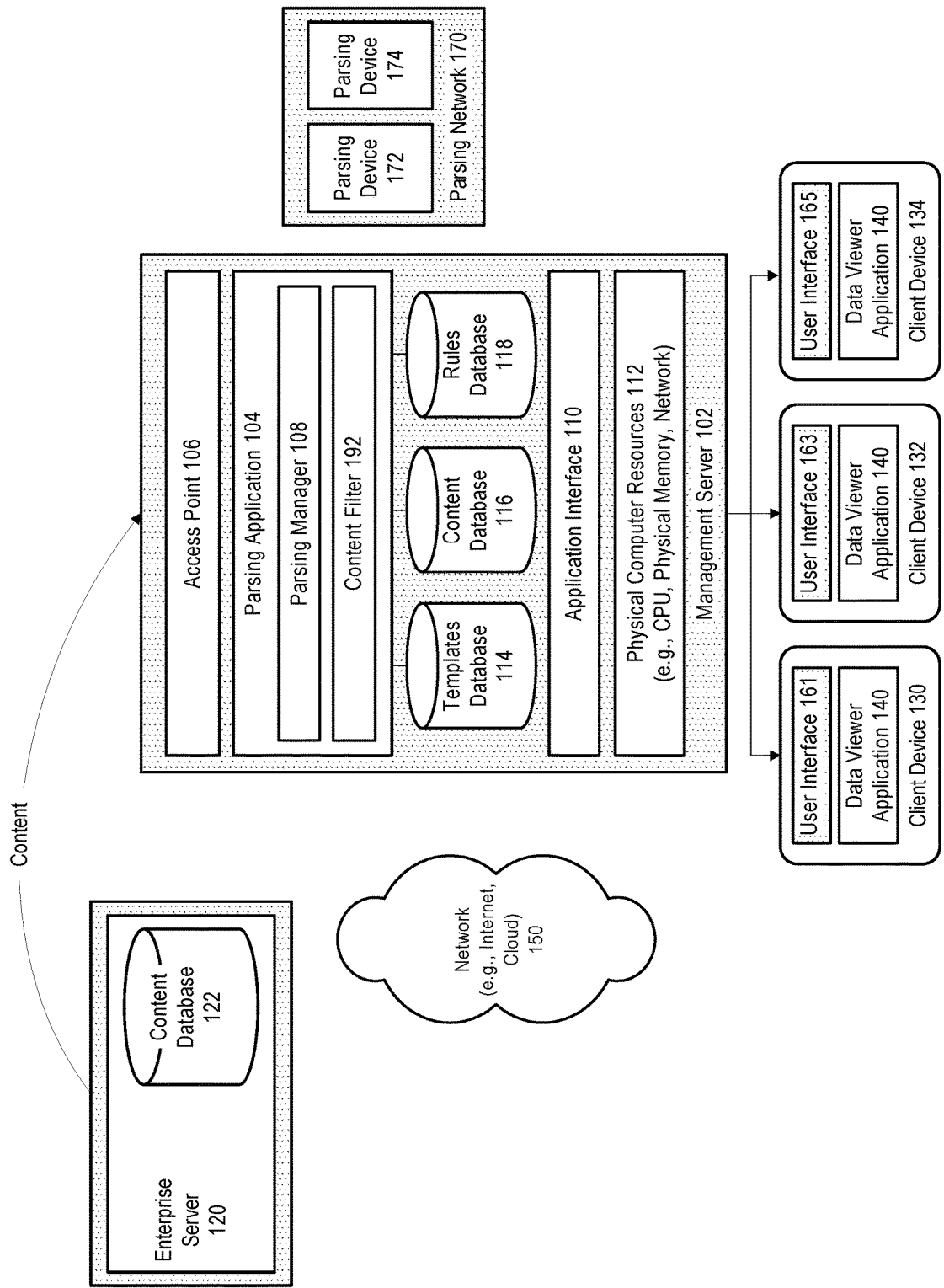
FIG. 1 illustrates an example content parsing environment, in accordance with an embodiment.

FIG. 1 illustrates an example content parsing environment, in accordance with an embodiment.

As illustrated in FIG. 1, content (content items) can be received at a management server 102 for parsing. The content can be received from one or more sources, such as an enterprise server 120 having a content database 122 for storing the content. The content items can include, for example, e-mails, documents, images, spreadsheets, and the like, in a variety of different file formats. In accordance with an embodiment, the load of received content can also be stored at the management server, and can be continually updated or refreshed. For example, additional or updated content can be received by the management server from the enterprise server at regular intervals, or the management server can be configured to periodically request additional or updated content from the enterprise server.

In accordance with an embodiment, the management server can include a parsing application 104 running thereon, for use in parsing the received content. The management server can also include an access point 106, and optionally one or more routers, for enabling communication between the management server and external devices or servers, such as the enterprise server, client devices, and parsing devices (parsers). For example, the access point can be configured to receive content from the enterprise server, or to send requests for content to the enterprise server. The access point can also be configured to receive requests from client devices for extracted content data, and to transmit extracted content data to the client devices. The access point can further be configured to send data including instructions from the management server to a network of parsing devices, and to receive data from the network of parsing devices.

In accordance with an embodiment, the management server, enterprise server, client devices, and parsing devices can communicate with one another over a communication network 150, such as the Internet, a local area network, wide area network, wireless or cellular network, or other network.

In accordance with an embodiment, the system can further include a parsing manager 108 for use in configuring a parsing network 170 of parsing devices 172, 174, and a content filter 192 for use in processing content items according to parsing rules and templates, as further described below. The system can also manage additional and/or subsequent processing of extracted content data received as a result of parsing content, as further described below.

In accordance with an embodiment, the management server can further include an application interface 110 for use in receiving requests from client devices 130, 132, 134, to retrieve extracted content data for display at their respective user interfaces 161, 163, 165. Each of the client devices can include a data viewer or data viewer application 140, 142, 144 for requesting and accessing the extracted content data. In accordance with an embodiment, the data viewer can be a web-based application accessible via a web browser on the client device, or a mobile application installed on the client device.

In accordance with an embodiment, the system can also include or otherwise access a plurality of databases, including a templates database 114, a content database 116, and a rules database 118. The rules database can store one or more rules (parsing rules) configured by a user of the system for parsing received content. A set of rules can be used to define a parsing strategy for a particular set of content. The parsing strategy can be stored as a template (parsing template) in the templates database, to be used for (applied to) the particular set of content. The content database can store content received by the management server for parsing, and can act as a central repository for content received from different sources. The content database can also be used to store content data extracted from received content items.

In accordance with an embodiment, different templates can be associated with different types of content. For example, content received from a particular source, or formatted according to a particular format, can be parsed according to a template associated therewith.

In accordance with an embodiment, the system can include physical computer resources 112, such as one or more processors (CPU), physical memory, network components, or other types of hardware resources.

Figure 2:
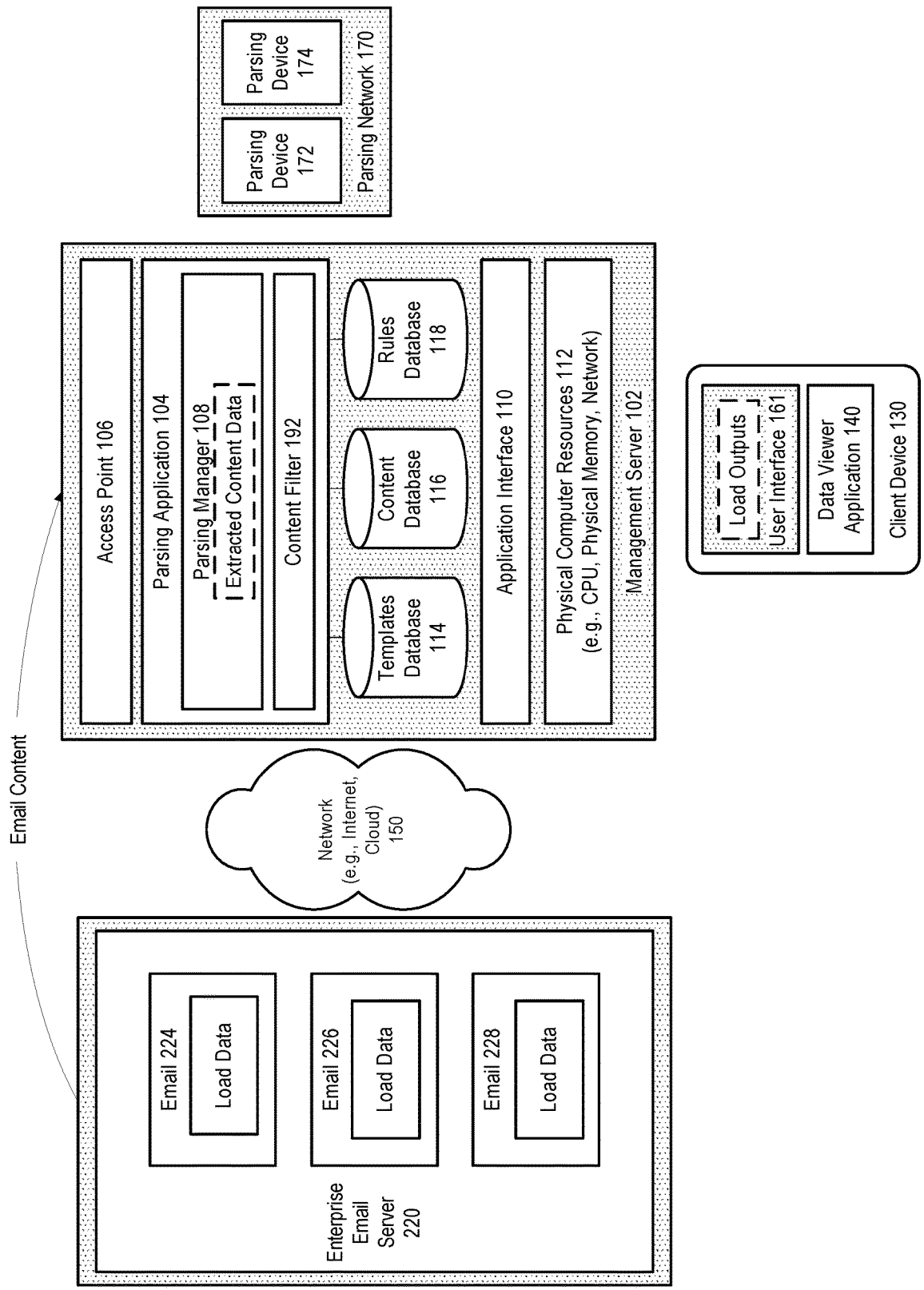
FIG. 2 illustrates an example content parsing environment, in accordance with an embodiment.

FIG. 2 illustrates an example content parsing environment, in accordance with an embodiment.

As illustrated in FIG. 2, the management server can receive email content (email content items) from an enterprise email server 220. The system can be configured to store or otherwise access login credentials associated with an email account, for the purpose of accessing the email content items to be parsed. The enterprise can be, for example, a freight carrier that receives email content items 224, 226, and 228 containing information (load data) corresponding to freight requests from a plurality of different sources. The load data can include information about, for example, a pickup date, pickup location, destination, equipment type (e.g., van, reefer, etc.), and freight type (e.g., full load (FL) or less than load (LTL)). In accordance with an embodiment, the email content items can be formatted differently according to the source that sent the email. For example, load data from one source can be in a single line format (e.g., each load or shipment object is contained within one line), load data from another source can be in a multiline format (e.g., each load or shipment object is contained within multiple lines), and load data from yet another source can be in a row style format (e.g., free form; there may be one shipment object per email).

In accordance with an embodiment, the content filter can be used to filter received email content items containing load data from those that do not contain load data, and only those email content items containing load data will be parsed for content extraction.

In accordance with an embodiment, the system can configure the parsing network (parser network) to extract the load data from the filtered email content items, and provide the extracted load data as a plurality of load outputs for display at the client device. Each load output of the plurality of load outputs can correspond to a load data extracted from an email content item of the enterprise.

In accordance with an embodiment, the load outputs can be presented or displayed in a suitable format such as a table format. The system can also be configured to apply mapping rules to extracted content data, to format the data for presentation at a client device. For example, the mapping rules can map portions of extracted content data to particular columns in a table. In accordance with an embodiment, the load outputs can also be presented or displayed in a real-time visualization such as a real-time map displayed at the data viewer.

Figure 3:
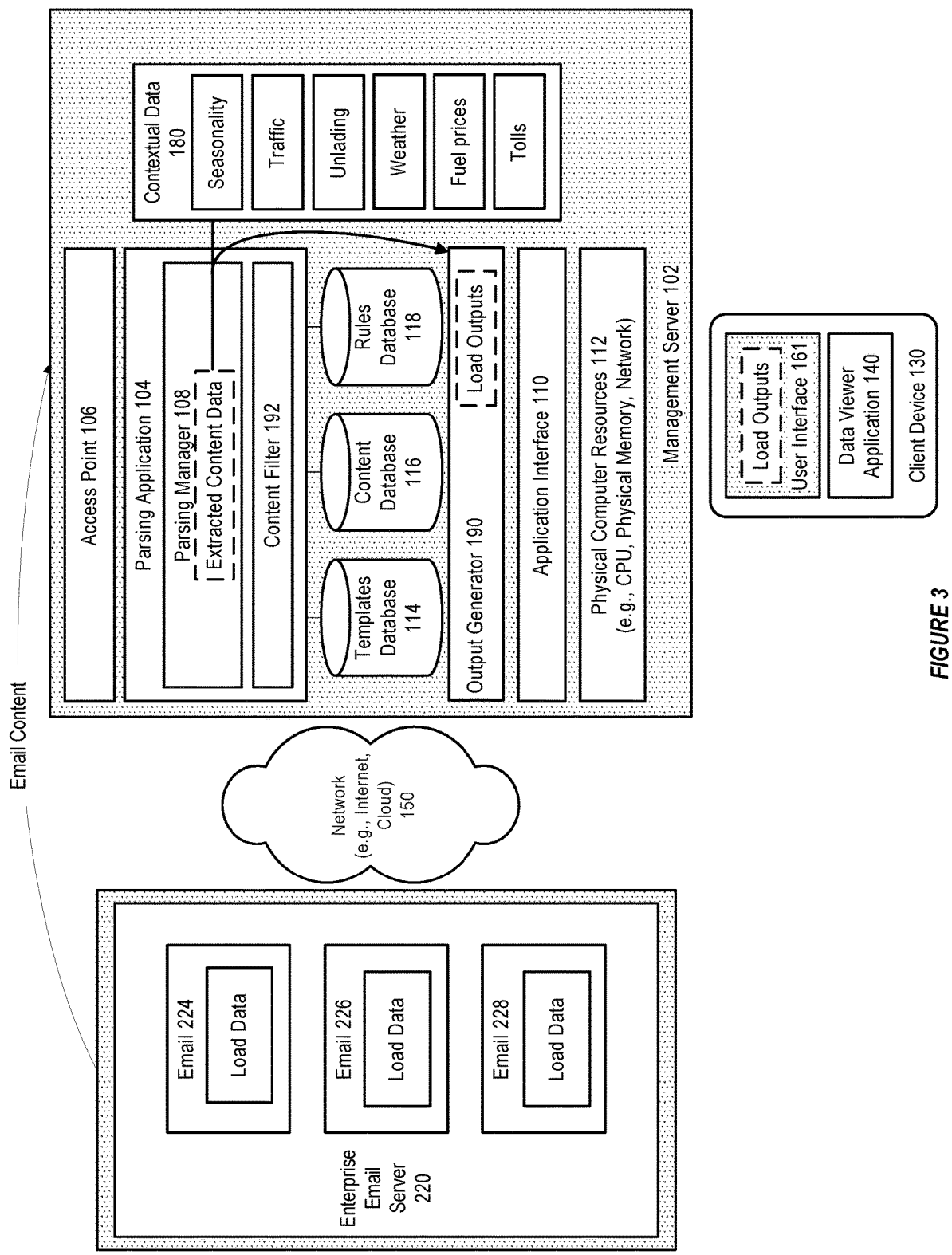
FIG. 3 further illustrates an example content parsing environment, in accordance with an embodiment.

FIG. 3 further illustrates an example content parsing environment, in accordance with an embodiment.

In accordance with an embodiment, the system can manage additional and/or subsequent processing of extracted content data received as a result of parsing content. For example, the system can be configured to combine extracted content data describing loads, with contextual data 180 describing factors that could potentially affect the booking and scheduling of loads, such as seasonality, traffic, unlading, weather, fuel prices, and tolls. In accordance with an embodiment, contextual data can correspond to a particular driver, vehicle, region, date, and/or time. The contextual data can also be predictive in that it corresponds to a date or time in the future, such as a future pickup date or time.

In accordance with an embodiment, an output generator 190 can be used to analyze the extracted content data and the contextual data, and automatically generate load outputs according to an outcome such as maximizing freight for a particular driver or vehicle.

In accordance with an embodiment, the system can use location data (e.g., global positioning system data) to determine a route associated with one or more loads, and can use the contextual data to determine which of the routes are more preferred for booking. For example, the traffic and weather conditions for some routes could indicate that a longer transit time, or fuel prices or tolls could indicate that the route would be less economical to undertake. In accordance with an embodiment, the output generator can include determined routes as part of the load outputs. The output generator can determine a priority of each load or route, and can present the load outputs in accordance with the determined priority. For example, the output generator can present a listing of loads or routes in order of priority, or select for presentation only those loads or routes meeting a particular priority threshold, for inclusion in the load outputs to be presented at a client device, or build an optimal route according to a determined ordering of one or more loads.

In accordance with an embodiment, load outputs can be used, for example, to identify and schedule loads based on fleet availability, automatically arrange load bookings, conduct automated negotiation of transport rates, generate automatic replies to freight requests, track loads and vehicles, and dispatch drivers to pick up loads. In accordance with an embodiment, the system can more efficiently process a larger volume of content items than could be processed manually by an individual user, enabling an increased number of load outputs, which in turn can result in an increased number of load bookings for an enterprise.

Figure 4:
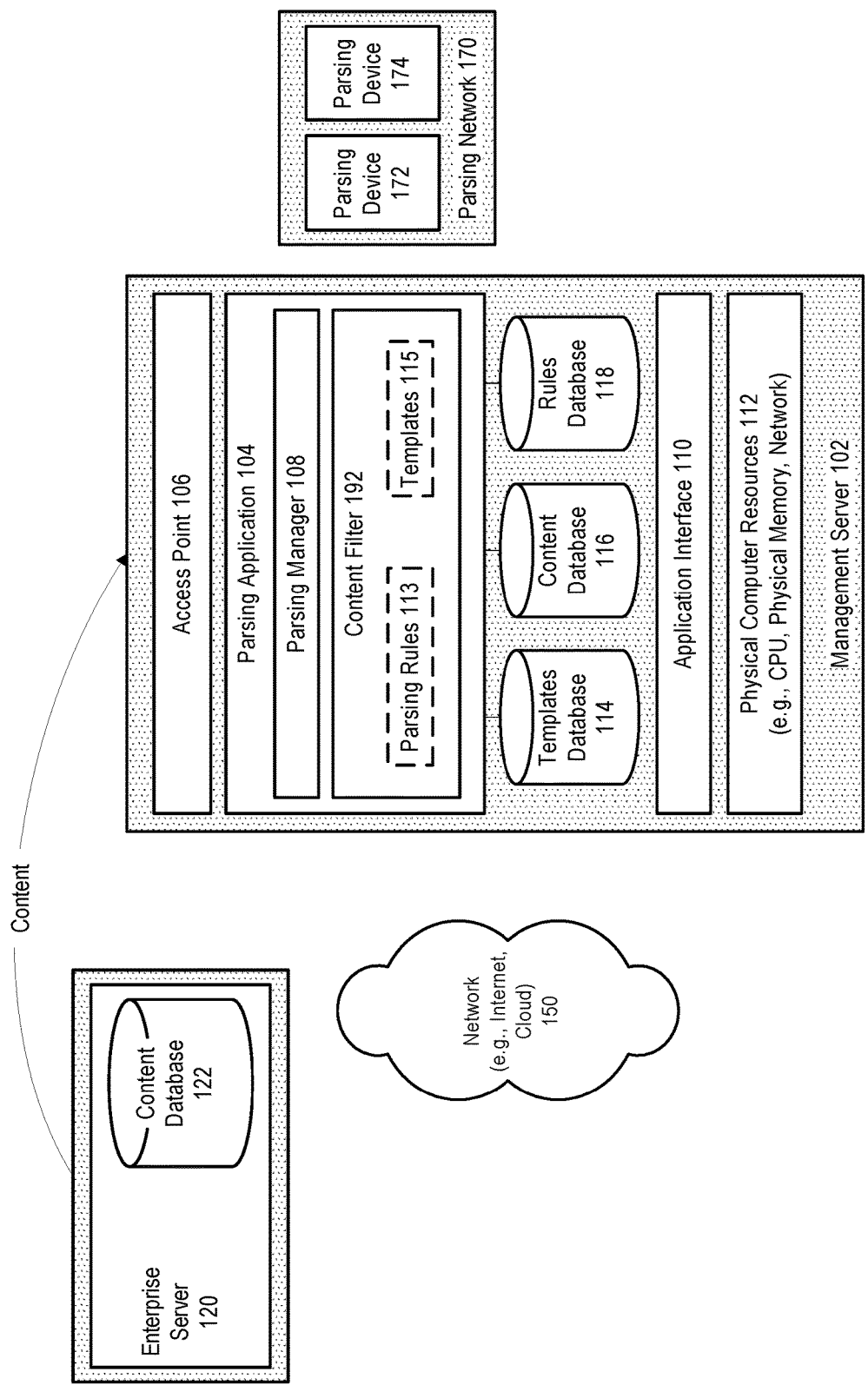
FIG. 4 illustrates an example use of a content parsing environment, in accordance with an embodiment.

FIG. 4 illustrates an example use of a content parsing environment, in accordance with an embodiment.

As illustrated in FIG. 4, the system can include a content filter for use in filtering content items and determining parsing rules 113 and templates 115 to be applied to content items. The content filter can determine attributes of content items to be parsed, and can filter or otherwise associate the content items with categories based on their determined attributes.

In accordance with an embodiment, content can be filtered according to criteria such as whether or not it contains load data, and content items that are determined to contain load data can be set aside or otherwise selected or designated for parsing. Content items can also be filtered according to other criteria such as a determination of the number loads contained therein, an amount and frequency of content items received from a particular source, complexity of data format within content items, and stability of format (e.g., a determination of whether content items from the same source differ significantly in format).

In one example embodiment, the content filter can be configured to search for specific phrases or keywords within content items that are indicative of the content item containing load data. Different parsing rules or templates can be associated with different attributes, such as the source of content (e.g., a particular company, or in the case of email content, a particular sender) and/or content formatting (e.g., single line, multiline, or row style), and the content filter can be used to match parsing rules and/or templates to content items. For example, content received from a particular source, or formatted according to a particular format, can be parsed according to a template associated therewith.

In accordance with an embodiment, templates can be generated using parsing rules. As used herein, a parsing rule refers to a piece of software logic or other instruction that can be used by a parsing device to extract content data from a content item. For example, a parsing rule can indicate a walker type for locating content data within a content item, such as an HTML or text walker. In accordance with an embodiment, a template associated with a plurality of parsing rules can indicate a series of steps or instructions to be followed when parsing a particular type of content.

For example, a template can indicate that for a particular source of content, a parsing device will follow a process of: identifying or locating relevant data boundaries within each content item, to determine a virtual table, identifying or locating relevant load data boundaries, to determine a virtual load data row, and identifying or locating a relevant load property, to determine a virtual cell.

In accordance with an embodiment, a parsing device can be configured to use a query language (e.g., XML Path Language) for selecting nodes from an XML or HMTL formatted content item, to identify or locate load data objects within a content item.

Figure 5:
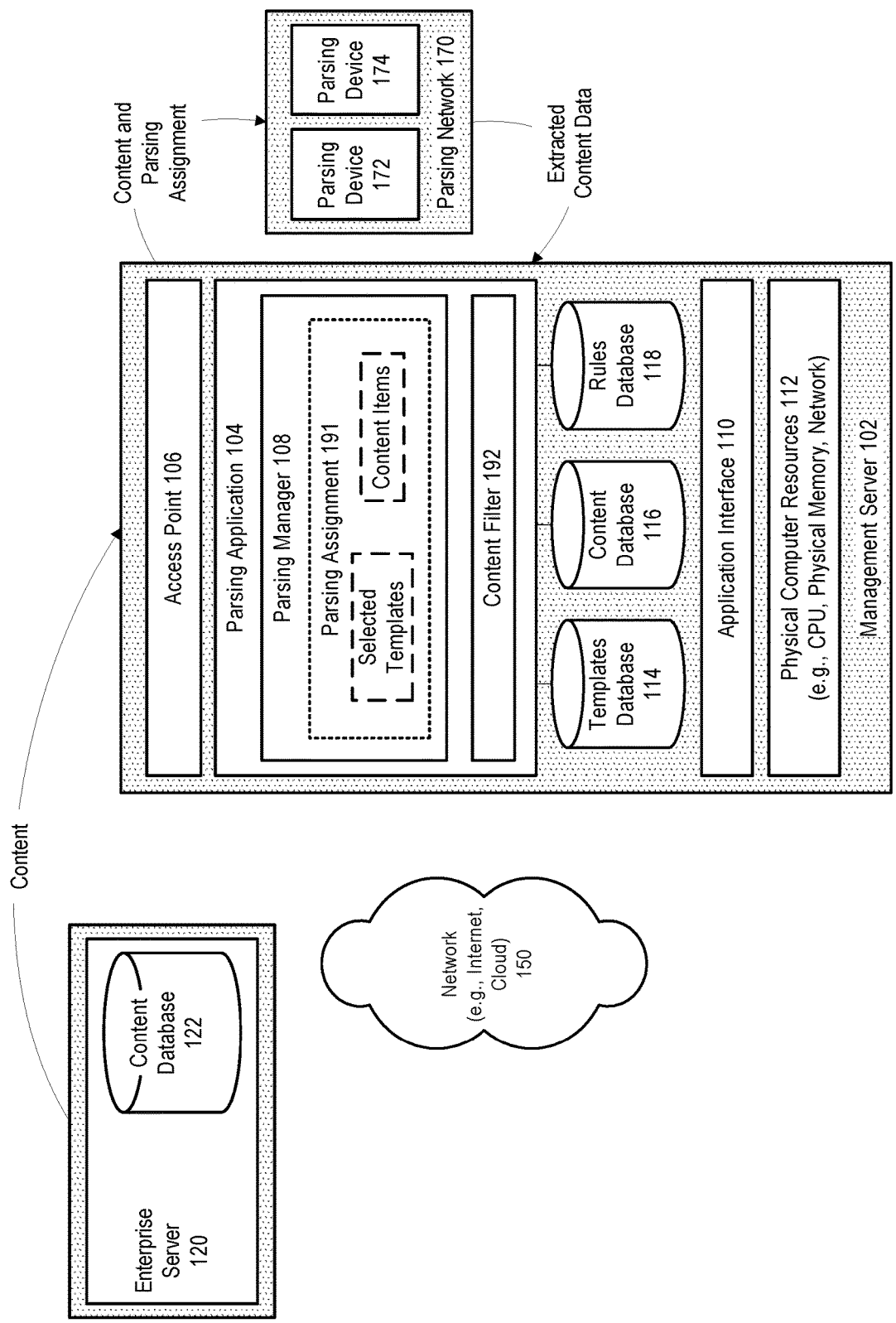
FIG. 5 further illustrates an example use of a content parsing environment, in accordance with an embodiment.

FIG. 5 further illustrates an example use of a content parsing environment, in accordance with an embodiment.

As illustrated in FIG. 5, the parsing manager can generate or otherwise determine a parsing assignment 191 for one or more parsing devices within the parsing network. In accordance with an embodiment, the parsing assignment can be generated or determined based on one or more of: a number of parsing devices within the parsing network, capacity of parsing devices within the parsing network, functionality of parsing devices within the parsing network, availability of parsing devices within the parsing network, a number of templates to be used in parsing, and a volume or load of content items to be parsed. The volume or load of content items can refer to a current volume or load of content items received, or predicted volume or load of content items to be received. The prediction can be based on historical traffic data indicating previous loads received. The capacity and availability of parsing devices can be based on current status data reflecting, for example, a current capacity and availability of the parsing devices within the network, or predicted status data reflecting, for example, a predicted capacity and availability of the parsing devices within the network.

In accordance with an embodiment, the parsing assignment can include an indication of content items to be processed by each parsing device, including identifying which content items and/or an amount of content items, and which template(s) are to be used by the parsing devices. In an embodiment, the parsing assignment can indicate or identify particular parsing devices within the parsing network. In another embodiment, rather than indicating particular parsing devices within the parsing network, the parsing assignment can indicate a number of parsing devices to be used or a volume of content items to be parsed, and the parsing network can be configured to select the parsing devices and distribute the content items and templates accordingly.

In accordance with one example embodiment, a plurality of content items can be received at the management server, and the content filter can filter the content items into categories. For example, the received content may be associated with three different sources: Company A, Company B, and Company C. The parsing manager can determine or select a plurality of templates respectively associated with Company A, Company B, and Company C, for use in parsing the content.

In accordance with an embodiment, the parsing manager can further determine, based on the amount of content items to be parsed (e.g., a current or predicted amount), a number of parsing devices to use for the parsing. An allocation of content items and templates for each of the parsing devices can be determined and indicated in the parsing assignment.

In accordance with an embodiment, the management server can receive status data from the parsing network describing the processing speed, functionality, capacity, and availability of parsing devices in the parsing network. Each template can be associated with one or more jobs or tasks to be performed by a parsing device. Parsing devices having faster processor speed, appropriate functionality, larger capacity, or more availability can be tasked with a greater number of content items, a greater number of templates and/or more complex templates (e.g., those associated with a greater number of jobs or tasks).

In accordance with an embodiment, as conditions change, such as changes in the current or predicted load of content items to be parsed, addition or adjustment of templates to be used, or receipt of updated status data of parsing devices within the parsing network, the parsing assignment can be adjusted or updated, or a new parsing assignment generated by the parsing manager. The adjusted or new assignment can indicate more or fewer parsing devices to be used, a revised assignment of templates, or other appropriate changes to the parsing process, and the allocation of content items and templates to each parsing device can be adjusted accordingly.

In accordance with an embodiment, the parsing manager can determine or select a particular grouping of parsing devices within the parsing network for use in parsing content items. In an example embodiment, the grouping can include a subset of the parsing devices within the parsing network. Parsing devices can be automatically added or removed from the grouping based on changes in availability, capacity, or functionality. For example, the parsing network can send updated data to the management server relating to availability, capacity, or functionality of parsing devices. In response to receiving the updated data, the management server can be configured to adjust the parsing assignment or otherwise send an instruction or request to the parsing network to add or remove parsing devices from a configured set or grouping. For example, if the management server receives an indication that additional parsing devices have become available, and the management server determines that there is a need for additional parsing devices, the management server can send an instruction to the parsing network to select additional parsing devices for inclusion within the grouping.

Figure 6:
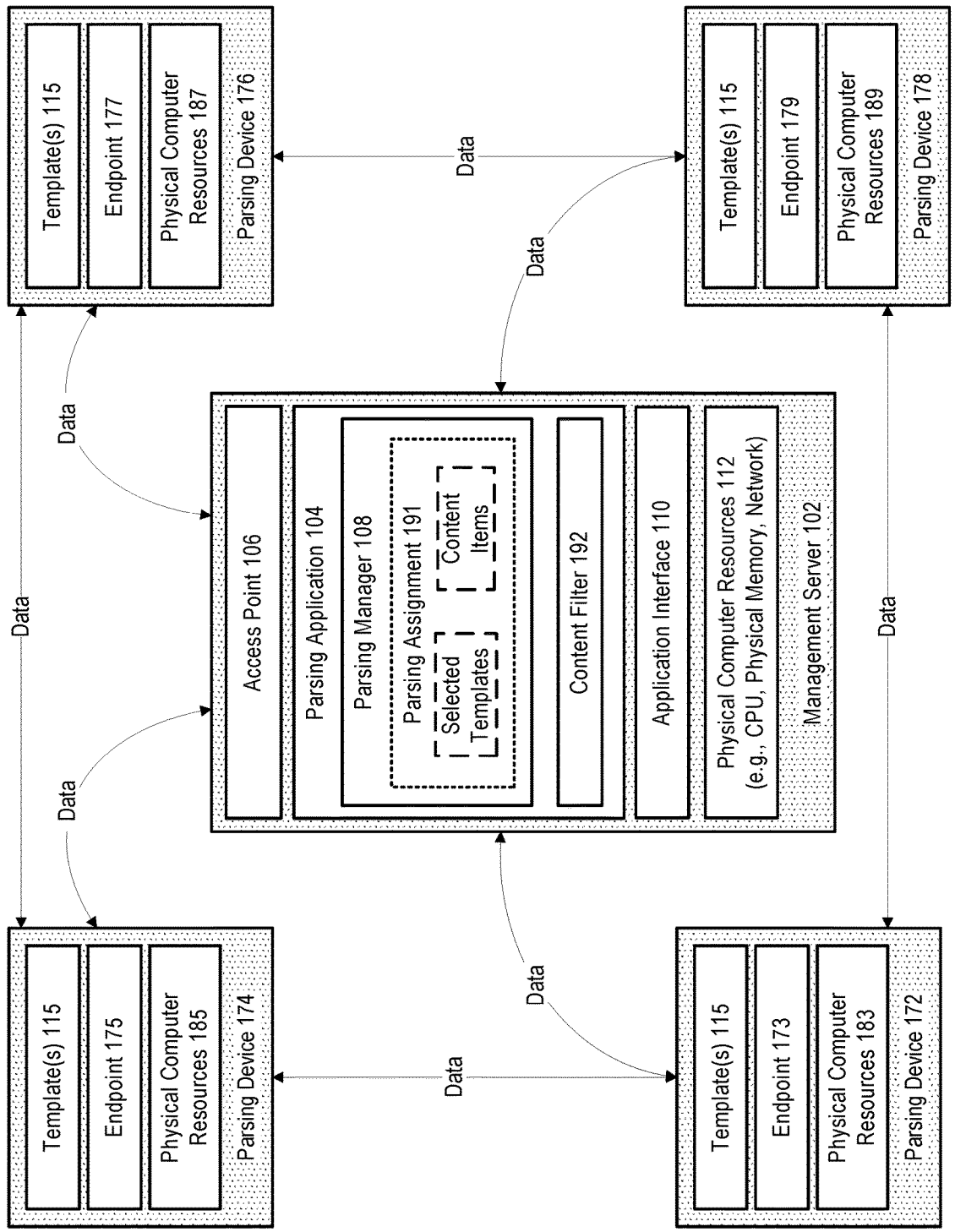
FIG. 6 illustrates the parsing of content, including the use of a parsing network, in accordance with an embodiment.

FIG. 6 illustrates the parsing of content, including the use of a parsing network, in accordance with an embodiment.

As illustrated in FIG. 6, the parsing network can include a plurality of parsing devices 172, 174, 176, 178. In accordance with the embodiment, each parsing device can include or be associated with a respective endpoint 173, 175, 177, 179 for use in communicating with other parsing devices and with the management server. Data and other communications from the management server, including content items, parsing assignments, requests, instructions, or other data, can be addressed to particular endpoints of particular parsing devices within the parsing network, or can be addressed to another communication point within the parsing network, for distribution to parsing devices within the network. The parsing devices can include, for example, one or more servers communicating with one another in a cloud environment. In accordance with an embodiment, each of the parsing devices can be associated with a trust relationship to ensure that only properly authenticated parsing devices are included within the parsing network for communication with one another and with the management server.

In accordance with an embodiment, a grouping of parsing devices can perform parsing of their allocated content items according to their assigned templates, and can send the resulting extracted content data to the management server for further processing. The parsing devices can further include physical computer resources 183, 185, 187, 189, such as one or more processors (CPU), physical memory, network components, or other types of hardware resources for use in parsing the content items according to the templates.

Figure 7:
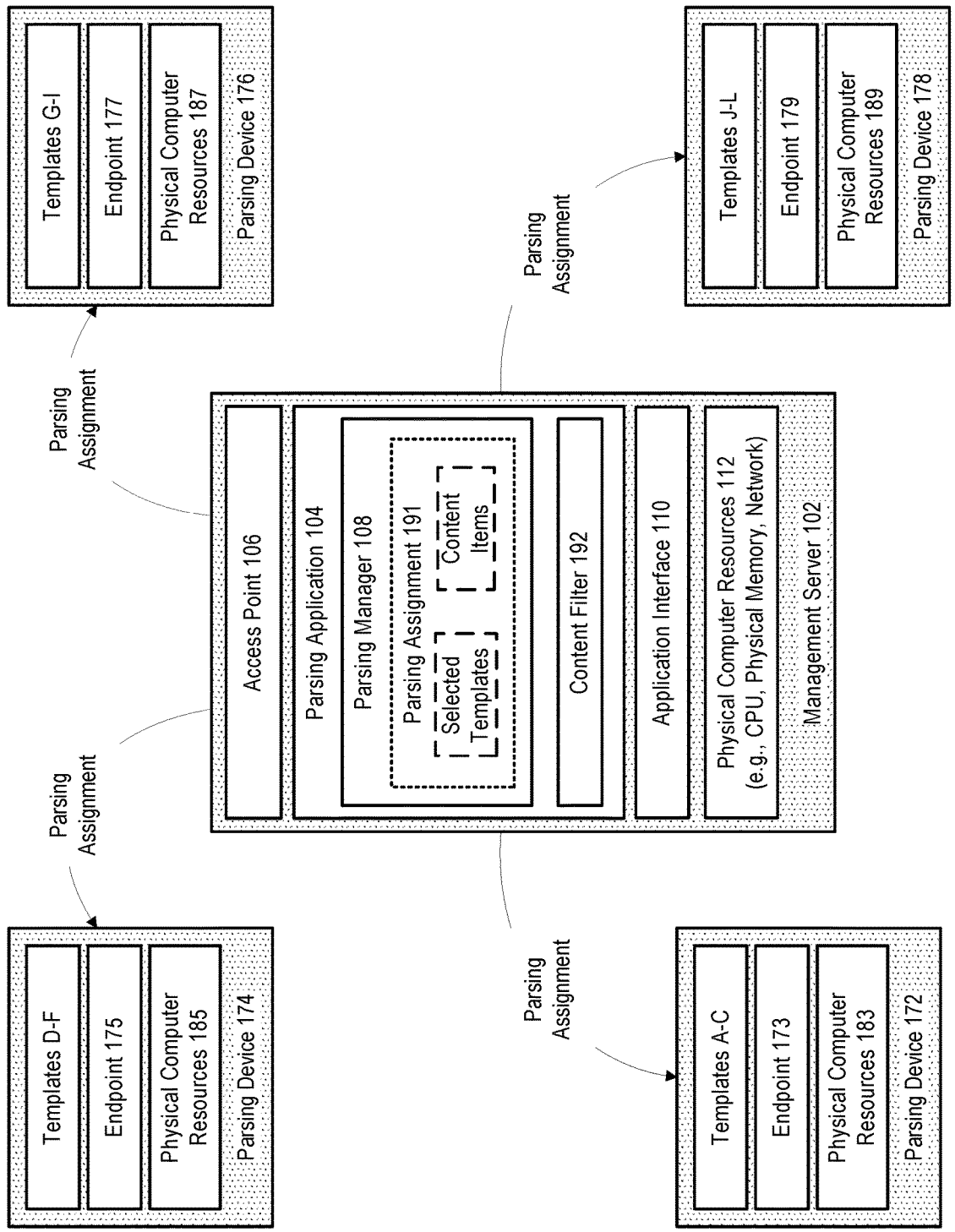
FIG. 7 further illustrates the parsing of content, including the use of a parsing network, in accordance with an embodiment.

FIG. 7 further illustrates the parsing of content, including the use of a parsing network, in accordance with an embodiment.

As illustrated in FIG. 7, a parsing assignment can be determined in which each parsing device is assigned a plurality of templates for parsing. For example, in a case where twelve templates and four parsing devices are selected for parsing, each parsing device can be allocated an equal number of three templates. A first parsing device is assigned Templates A-C, a second parsing device is assigned Templates D-F, a third parsing device is assigned Templates G-I, and a fourth parsing device is assigned Templates J-L.

In accordance with an embodiment, the management server can allocate content items among the parsing devices based on the template(s) associated therewith. For example, the parsing manager can configure the parsing assignment so that content items associated with templates A, B, or C are allocated to parsing device 172, for parsing according to the appropriate template.

In accordance with an embodiment, as additional templates are created or otherwise indicated for parsing content items, the parsing manager can request addition or otherwise select additional parsing devices within the parsing network, to associate those parsing devices with the grouping, and can update or generate a new parsing assignment allocating the additional templates to the additional parsing devices. Similarly, as fewer templates are needed, the parsing manager can request removal or otherwise remove parsing devices from the grouping, and can update or generate a new parsing assignment accordingly.

Figure 8:
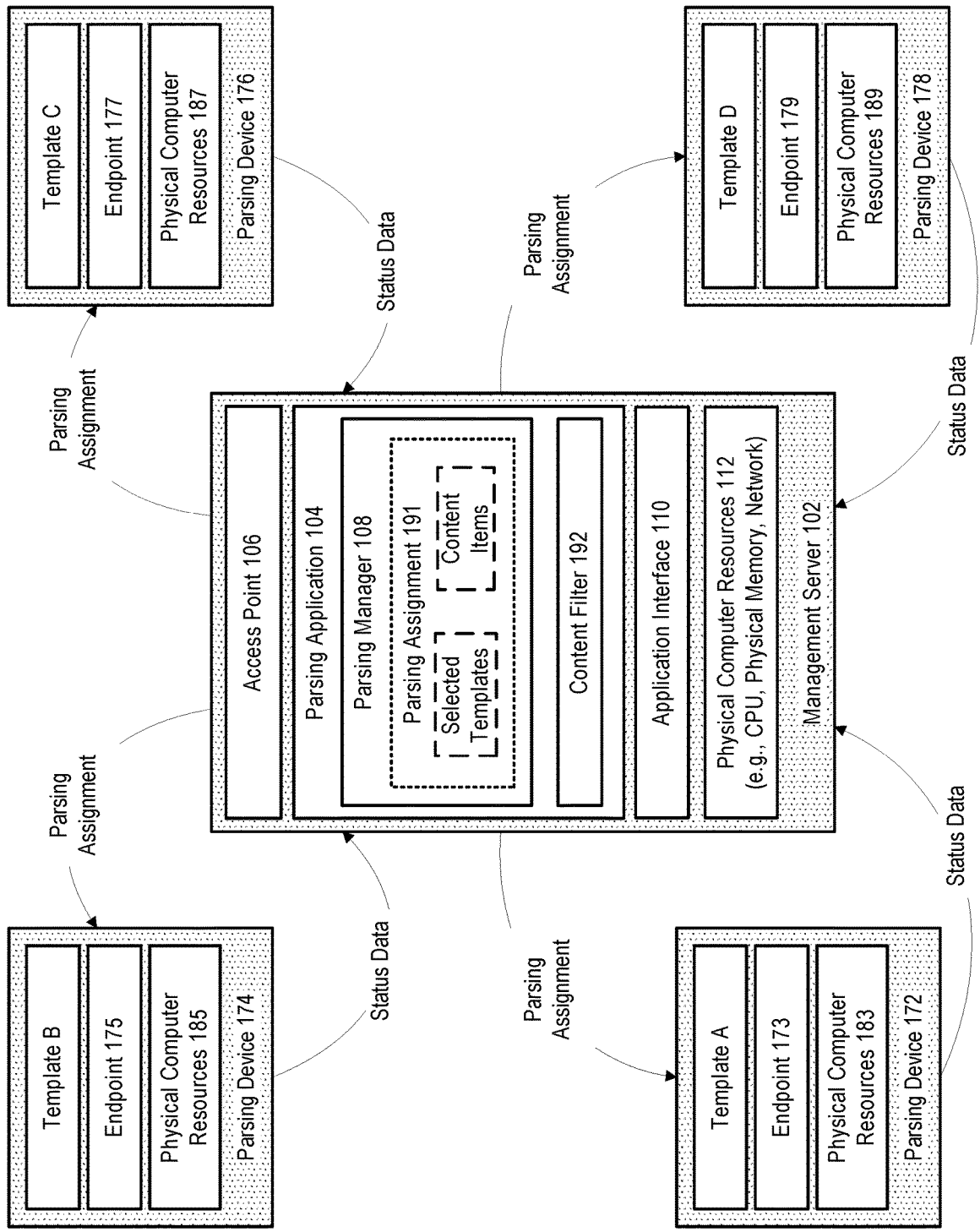
FIG. 8 further illustrates the parsing of content, including the use of a parsing network, in accordance with an embodiment.

FIG. 8 further illustrates the parsing of content, including the use of a parsing network, in accordance with an embodiment.

As illustrated in FIG. 8, a parsing assignment can be determined in which each parsing device is assigned a single template for parsing. The assignment can be based on, for example, a complexity of an assigned template (e.g., a number of jobs or tasks associated with the template), a current or predicted volume or load of content items associated with a particular template, and/or a status data of a parsing device.

For example, different parsing devices can be configured to perform different (respective) parsing functionalities. In accordance with an embodiment, templates corresponding to particular jobs or tasks can be assigned to an appropriate parsing device based on the parsing device having the appropriate functionality for performing the jobs or tasks indicated by the template. For example, a parsing device can be configured to parse a particular type of content format.

As another example, the parsing manager can determine, based on a current or predicted load of content items, that a higher proportion of the content items to be parsed are associated with a particular template, such as Template B, than associated with a different template such as Template C. The parsing assignment can indicate that a parsing device with sufficient capacity and availability to handle processing of the content items is assigned Template B.

Figure 9:
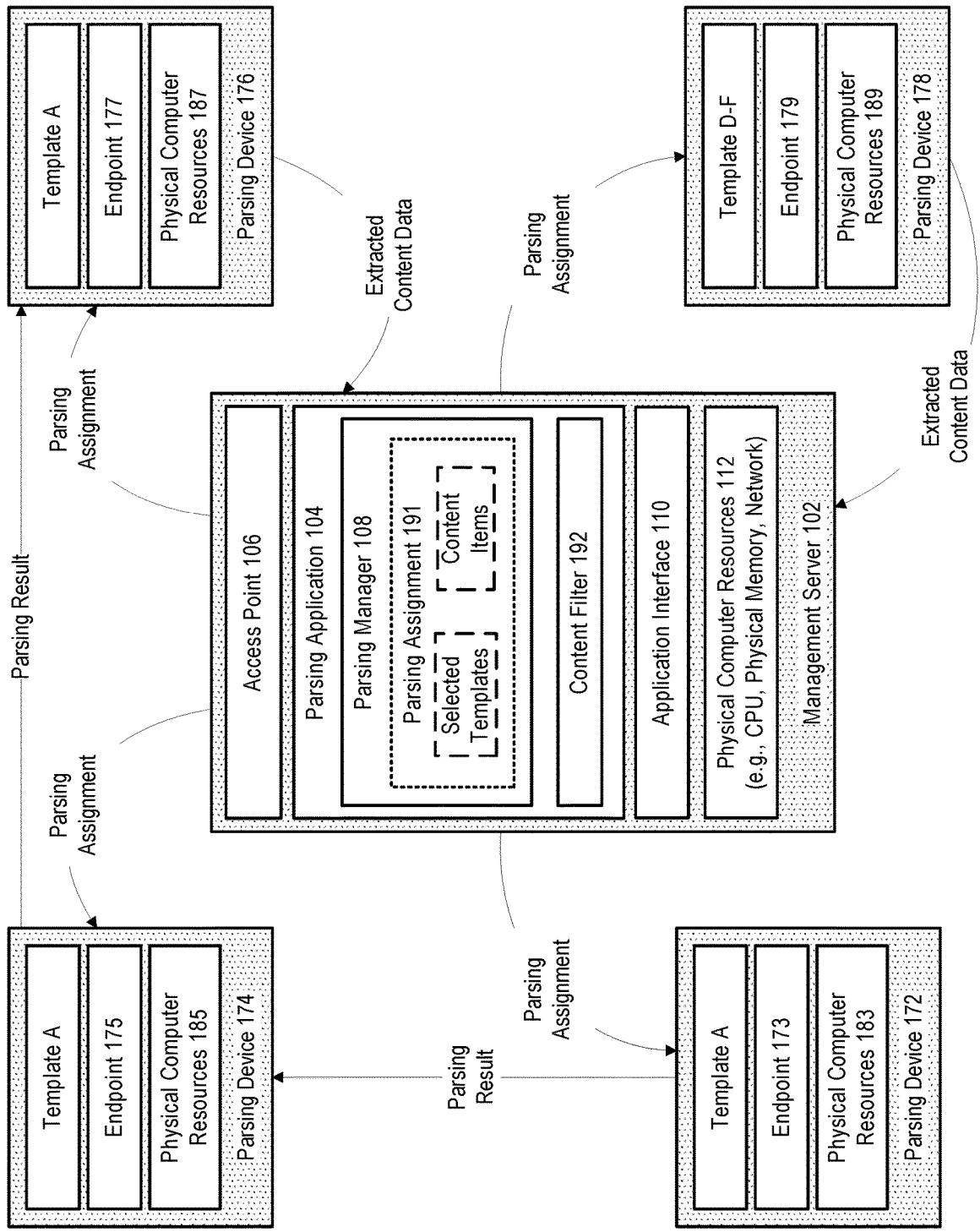
FIG. 9 further illustrates the parsing of content, including the use of a parsing network, in accordance with an embodiment.

FIG. 9 further illustrates the parsing of content, including the use of a parsing network, in accordance with an embodiment.

As illustrated in FIG. 9, a parsing assignment can be determined in which two or more parsing devices communicate with one another to perform parsing of the same template, as part of a distributed parsing process.

For example, Template A might be a more complex template that indicates several steps (jobs) to be performed. The parsing devices 172, 174, and 176 can each be assigned particular (or respective) jobs or tasks for Template A, and can communicate with one another to complete all jobs or tasks for Template A. For example, the parsing device 172 can be configured to send the result (parsing result) of its job(s) or task(s) to the parsing device 174, the receipt of which causes the parsing device 174 to perform its assigned job(s) or task(s). The parsing device 174 can be configured to send its result (parsing result) to the parsing device 176, which in the illustrated embodiment is the final job or task to be performed for Template A. In accordance with an embodiment, the parsing device responsible for performing the final job or task (e.g., parsing device 176) can send the final extracted content data to the management server for further processing.

In accordance with an embodiment, the parsing assignment can assign less complex templates, such as those associated with fewer jobs or tasks, or templates associated with fewer content items, to other parsing devices within the parsing network. For example, the parsing device 178 can be assigned a plurality of templates, such as Templates D-F.

Figure 10:
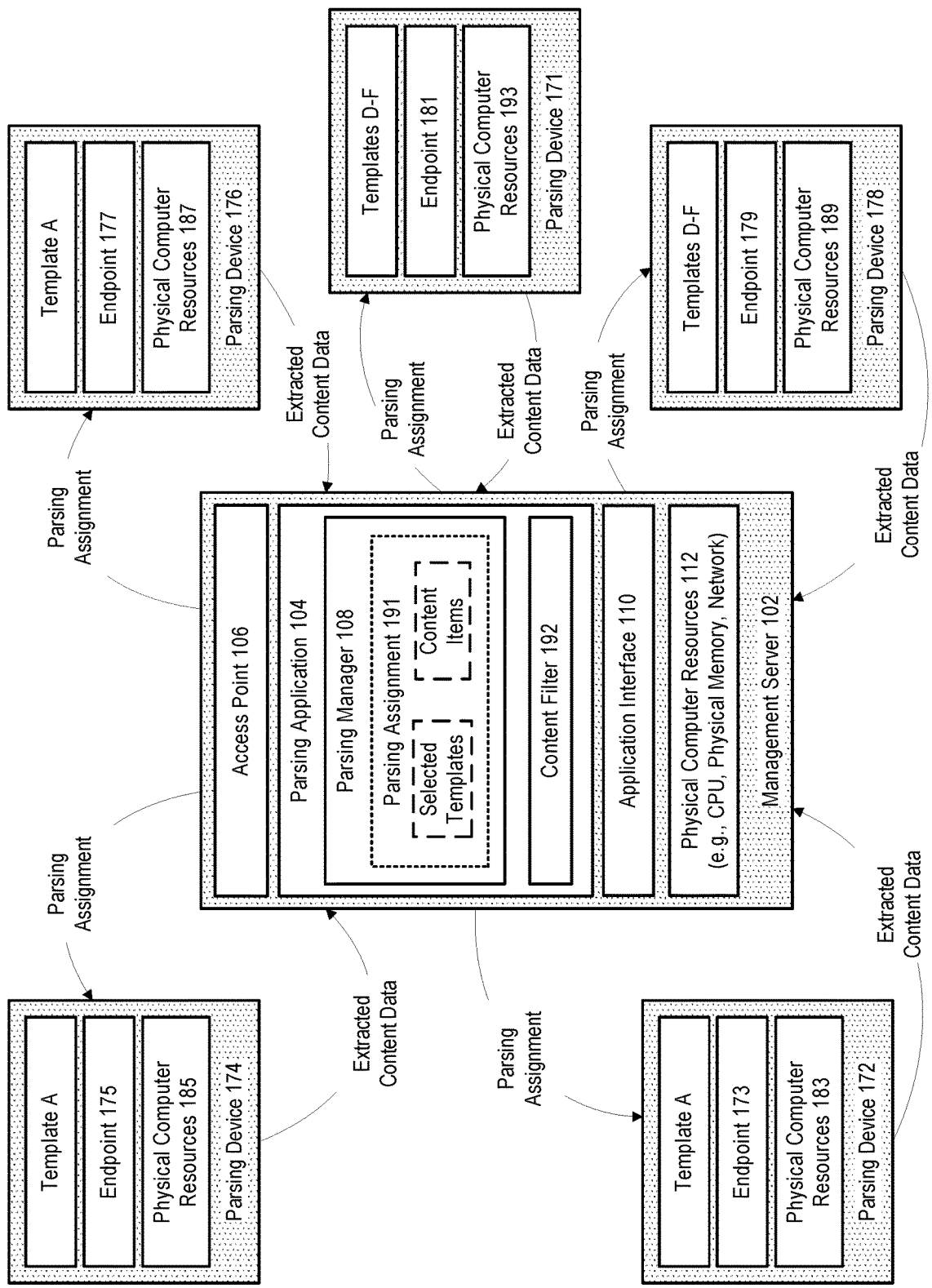
FIG. 10 further illustrates the parsing of content, including the use of a parsing network, in accordance with an embodiment.

FIG. 10 further illustrates the parsing of content, including the use of a parsing network, in accordance with an embodiment.

As illustrated in FIG. 10, a parsing assignment can be determined in which two or more parsing devices perform the same jobs or tasks associated with the same templates, as part of a parallel parsing process.

For example, the parsing devices 172, 174, 176 can all perform the same jobs or tasks associated with Template A, and can all be configured to send the extracted content data to the management server. In accordance with an embodiment, the parsing manager can be configured to select, as the final extracted content data for presentation as a data output, the extracted content data that is received first. As such, according to an embodiment the parsing devices 172, 174, 176 can be in competition with one another to produce the fastest result.

As further illustrated in FIG. 10, other parsing devices within the network, such as parsing devices 178, 171, can perform the same jobs or tasks associated with a plurality of Templates D-F. Such a parsing assignment, in which more parsing devices are allocated to parallel parsing for Template A than for other templates, can be used where parsing speed is important for content items associated with Template A, but less so for Templates D-F, or where an amount content items associated with Template A is relatively high (e.g., a proportion or percentage of content items associated with Template A is above a threshold amount) but an amount of content items associated with Templates D-F is less, is unknown, or is difficult to predict.

In accordance with an embodiment, in response to determining changes in the load (e.g., current or predicted load) of content items associated with a particular template, the system can request or otherwise indicate that more or fewer parsing devices be associated with the particular template.

Figure 11:
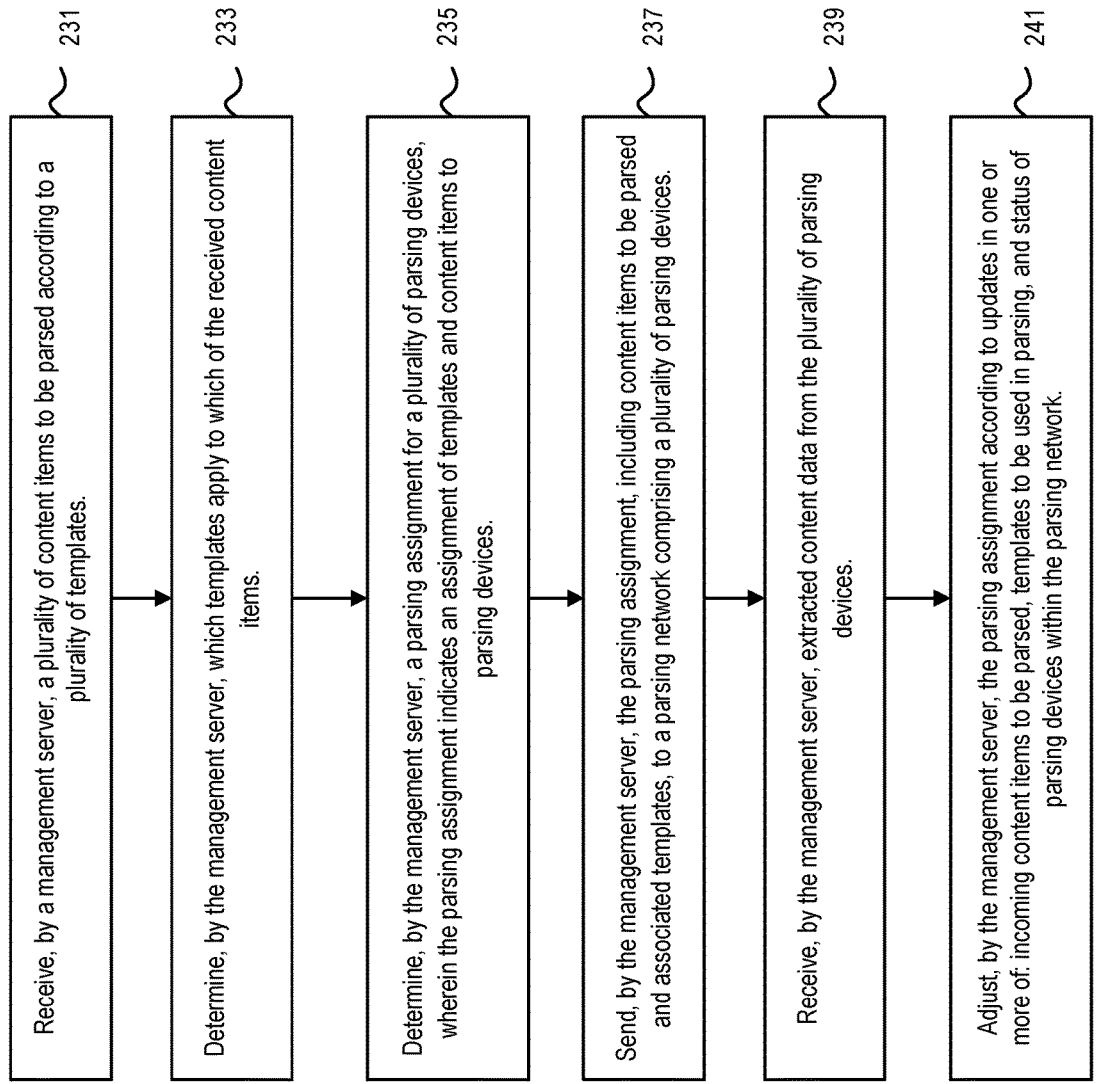
FIG. 11 illustrates a process for parsing of content, in accordance with an embodiment.

FIG. 11 illustrates a process for parsing of content, in accordance with an embodiment.

As shown in FIG. 11, at operation 231, the management server receives a plurality of content items to be parsed according to a plurality of templates.

At operation 233, the management server determines which templates apply to which of the received content items.

At operation 235, the management server determines a parsing assignment for a plurality of parsing devices, wherein the parsing assignment indicates an assignment of templates and content items to parsing devices.

At operation 237, the management server sends the parsing assignment, including content items to be parsed and associated templates, to a parsing network comprising a plurality of parsing devices.

At operation 239, the management server receives extracted content data from the plurality of parsing devices.

At operation 241, the management server adjusts the parsing assignment according to updates in one or more of: incoming content items to be parsed, templates to be used in parsing, and status of parsing devices within the parsing network.

In accordance with an embodiment, a scalable, autonomous system and method for content parsing can be provided that allows an enterprise to configure a parsing network to use templates for extracting relevant content data from a large load of content items. The templates can be customized according to the enterprise's needs, using parsing rules that are applicable to a variety of content items. Further, in accordance with some embodiments the system can be used as a tool to design a parser for any type of enterprise, for any type of content. The system can configure the parsing network to efficiently process content items with improved ease of use and speed from the user's perspective.

Embodiments can be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of embodiments has been provided for the purposes of illustration and description. It is not intended to be exhaustive or to limit the invention to the precise forms disclosed. Many modifications and variations will be apparent to the practitioner skilled in the art.

For example, although example embodiments have been described in which the content items to be parsed are email content items associated with an email account, embodiments are not limited thereto. For example, the system can be configured to extract load data from content items sourced from one or more logistics provider accounts. In accordance with an embodiment, the system can be configured to store or otherwise access login credentials associated with one or more user accounts for the purpose of accessing content items to be parsed. In accordance with an embodiment, the system can be configured to automatically extract load data from multiple different sources, and it is not necessary for a user to manually toggle between multiple logistics provider and email account screens. In accordance with an embodiment, the system can consolidate and display the load data extracted from multiple different sources in a single place, e.g., a virtual load board.

Additionally, the number of parsing devices within the parsing network is not limited to that illustrated in the drawings. Further, any portion or combination of the processes illustrated in FIGS. 7-10 can be used to parse content.

Moreover, embodiments are not limited to application in the freight carrier context as described in example embodiments; the system can be used by many types of enterprises in many different industries to parse content items and extract relevant data.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for content parsing, comprising:
one or more computers, including a management server executing thereon that is configured to access content items to be parsed, and to configure a parsing network comprising parsing devices in communication with the management server, for use in parsing the content; and
a memory provided at the one or more computers, the memory storing instructions that, when executed, cause the system to:
access, from a plurality of sources, a plurality of content items to be parsed;
determine a parsing assignment for one or more parsing devices within the parsing network, including an indication, for each parsing device within the parsing network indicated by the parsing assignment, of content items to be processed by the parsing device, and one or more parsing rules to be used by the parsing device in parsing the content items;
send the parsing assignment to the parsing network;
receive content data including freight request data from the plurality of sources, the freight request data extracted from the plurality of content items according to the parsing assignment; and
generate a load output data identifying loads for booking from the plurality of sources, by reference to the freight request data extracted from the plurality of content items and a contextual data associated with one or more factors affecting booking or scheduling of loads.

2. The system of claim 1, wherein the parsing assignment is determined based on one or more of a functionality, availability, or capacity of at least one parsing device within the parsing network.

3. The system of claim 1, wherein the instructions, when executed, further cause the system to send a request to the parsing network for additional parsing devices to be used in parsing.

4. The system of claim 3, wherein the request for additional parsing devices is sent in response to determining a predicted volume of content items to be received.

5. The system of claim 1, wherein the freight request data describes one or more of a pickup date, pickup location, destination, equipment type, and freight type.

6. The system of claim 1, wherein the one or more factors affecting booking or scheduling of loads includes information associated with at least one of seasonality, traffic, unlading, weather, fuel prices, tolls, drivers, vehicles, regions, date, or time.

7. The system of claim 1, wherein the parsing assignment is determined by reference to a predicted volume of content items to be received based on historical data indicating content items previously received by the system.

8. The system of claim 1, wherein route the instructions, when executed, further cause the system to determine a route associated with one or more of the loads identified by the load output data, and the route is determined by reference to the contextual data and a location data.

9. The system of claim 1, where the instructions, when executed, further cause the system to determine a priority of each load identified by the load output data, and to display the load output data at a client device according to the determined priority of each load.

10. A method of content parsing, comprising:
accessing, by a management server executing on one or more computers, a plurality of content items to be parsed;
determining, by the management server, a parsing assignment for one or more parsing devices within a parsing network in communication with the management server, wherein the parsing assignment includes an indication, for each parsing device within the parsing network indicated by the parsing assignment, of content items to be processed by the parsing device, and one or more parsing rules to be used by the parsing device in parsing the content items;
sending, by the management server, the parsing assignment to the parsing network;
receiving, by the management server, content data including freight request data from the plurality of sources, the freight request data extracted from the plurality of content items according to the parsing assignment; and
generating, by the management server, a load output data identifying loads for booking from the plurality of sources, by reference to the freight request data extracted from the plurality of content items and a contextual data associated with one or more factors affecting booking or scheduling of loads.

11. The method of claim 10, wherein the parsing assignment is determined based on one or more of a functionality, availability, or capacity of at least one parsing device within the parsing network.

12. The method of claim 10, further comprising sending a request to the parsing network for additional parsing devices to be used in parsing.

13. The method of claim 12, wherein the request for additional parsing devices is sent in response to determining a predicted volume of content items to be received.

14. The method of claim 10, wherein the freight request data describes one or more of a pickup date, pickup location, destination, equipment type, and freight type.

15. The method of claim 10, wherein the one or more factors affecting booking or scheduling of loads includes information associated with at least one of seasonality, traffic, unlading, weather, fuel prices, tolls, drivers, vehicles, regions, date, or time.

16. The method of claim 10, wherein the parsing assignment is determined by reference to a predicted volume of content items to be received based on historical data indicating content items previously received by the system.

17. The method of claim 10, further comprising determining a route associated with one or more of the loads identified by the load output data, by reference to the contextual data and a location data.

18. The method of claim 10, further comprising determining a priority of each load identified by the load output data, and displaying the load output data at a client device according to the determined priority of each load.

19. A non-transitory computer readable storage medium, including instructions stored thereon that when read and executed by one or more computers, cause the one or more computers to perform steps comprising:

accessing, by a management server executing on the one or more computers, a plurality of content items to be parsed;

determining, by the management server, a parsing assignment for one or more parsing devices within a parsing network in communication with the management server, wherein the parsing assignment includes an indication, for each parsing device within the parsing network indicated by the parsing assignment, of content items to be processed by the parsing device, and one or more parsing rules to be used by the parsing device in parsing the content items;

sending, by the management server, the parsing assignment to the parsing network;

receiving, by the management server, content data including freight request data from the plurality of sources, the freight request data extracted from the plurality of content items according to the parsing assignment; and generating, by the management server, a load output data identifying loads for booking from the plurality of sources, by reference to the freight request data extracted from the plurality of content items and a contextual data associated with one or more factors affecting booking or scheduling of loads.

* * * * *